United States Patent
Udeshi et al.

(10) Patent No.: US 7,272,607 B2
(45) Date of Patent: Sep. 18, 2007

(54) SYSTEM AND METHOD FOR PROCESSING A HIERARCHICAL DATA TREE

(75) Inventors: Tushar Udeshi, Plano, TX (US); Eric Parker, Heath, TX (US)

(73) Assignee: Zyvex Labs, LLC, Richardson, TX (US)

( * ) Notice: Subject to any disclaimer, the term of this patent is extended or adjusted under 35 U.S.C. 154(b) by 542 days.

(21) Appl. No.: 10/698,178

(22) Filed: Oct. 31, 2003

(65) Prior Publication Data

US 2004/0111406 A1 Jun. 10, 2004

Related U.S. Application Data

(63) Continuation-in-part of application No. 10/306,464, filed on Nov. 27, 2002.

(51) Int. Cl.
*G06F 17/30* (2006.01)
(52) U.S. Cl. ............ 707/100; 707/200; 707/201; 707/202; 707/203; 707/204; 707/205
(58) Field of Classification Search ........ 707/200–205; 705/26; 702/182
See application file for complete search history.

(56) References Cited

U.S. PATENT DOCUMENTS

| | | | |
|---|---|---|---|
| 4,202,046 A | 5/1980 | Ward | |
| 5,469,366 A | 11/1995 | Yang et al. | |
| 6,279,007 B1 | 8/2001 | Uppala | |
| 6,539,519 B1 | 3/2003 | Meeker | |
| 6,597,359 B1 | 7/2003 | Lathrop | |
| 6,865,509 B1* | 3/2005 | Hsiung et al. | 702/182 |
| 6,986,739 B2 | 1/2006 | Warren et al. | |
| 2001/0044327 A1 | 11/2001 | Kanefsky | |
| 2002/0027563 A1 | 3/2002 | Van Doan et al. | |
| 2002/0138353 A1* | 9/2002 | Schreiber et al. | 705/26 |
| 2003/0137539 A1 | 7/2003 | Dees | |
| 2003/0187867 A1 | 10/2003 | Smartt | |
| 2003/0212725 A1 | 11/2003 | Ovshinsky et al. | |
| 2004/0205093 A1* | 10/2004 | Li et al. | 707/205 |

OTHER PUBLICATIONS

Hinze, "Memo Functions, Polytypically!", Institut fur Informatik III, University Bonn, Bonn Germany, Jul. 2000.
Tiankai et al., "the Etree Library: A System for Manipulating Large Octrees on Disk", School of Computer Science, Pittsburgh, PA Jul. 2003.

(Continued)

*Primary Examiner*—Tim Vo
*Assistant Examiner*—Olubusola Oni
(74) *Attorney, Agent, or Firm*—Haynes and Boone, LLP

(57) ABSTRACT

A method for performing an operation on a hierarchical data tree comprising retrieving data from an anchor node in the tree and a plurality of neighboring nodes each potentially affected by the operation. A cache is queried for a key representing the anchor node and the plurality of neighboring nodes based on the retrieved data. If the query finds a match, the retrieved data is replaced with cached data. If the query does not find a match, the operation is performed on the retrieved data to generate post-operation data, the retrieved data is replaced with the post-operation data and the post-operation data is stored in the cache based on the key.

55 Claims, 5 Drawing Sheets

OTHER PUBLICATIONS

Popinet, "Gerris: a Tree-Based Adaptive Solver for the Incompressible Euler Equations in Complex Geometries", Journal of Computational Physics Academic Press USA, vol. 190, No. 2, Sep. 2003.

International Search Report from PCT Application No. PCT/US2004/035625, Mar. 2005.

Written Opinion of the International Searching Authority from PCT Application No. PCT/US2004/035625, Mar. 2005.

E. Parker, et al., "Exploiting Self-Similarity in Geometry for Voxel Based Solid Modeling", Eight ACM Symposium on Solid Modeling and Applications SM'03, Jun. 16-20, 2003, Seattle, Washington.

E. Parker, et al., "Memulator: A Fast and Accurate Geometric Modeling, Visualization and Mesh Generation for 3D MEMS Design and Simulation", Nonotech 2003 vol. 2, Technical Proceedings of the 2003 Nanotechnology Conference and Trade Show.

T. Udeshi, "Tetrahedral Mesh Generation From Segmented Voxel Data", 12th International Meshing Roundtable, Sep. 14-17, 2003.

Co et al., "Iso-Splatting: A Point Based Alternative to Isosurface Visualization", Proceedings of the 11th Pacific Conference on Computer Graphics and Applications (PG'03), IEEE 2003.

International Search Report from PCT Application No. PCT/US2004/043833, May 2005.

Rusinkiewicz et al., "Qsplat: A Multiresolution Point Rendering System for Large Meshes", Computer Graphics Proceedings, Annual Conference Series 2000, pp. 343-352.

Written Opinion of the International Searching Authority from PCT Application No. PCT/US2004/043833, May 2005.

Chang et al., "LDI: a Hierarchical Representation for Image-Based Rendering", May 1999, ACM Special Interest Group on Computer Graphics and Interactive, pp. 291-298.

Pratt, "Direct Least-Squares Fitting of Algebraic Surfaces", Computer Graphics, vol. 21, No. 4, Jul. 1987.

Wilhelms et al., "Octrees for Faster Isosurface Generation", Jul. 1992, ACM Press, vol. 22, Issue 3, pp. 201-227.

* cited by examiner

```
OCTREE_ELEMENT_STRUCT_1  /501
{ reference to OCTREE_ELEMENT_STRUCT_4;  502
  reference to OCTREE_ELEMENT_STRUCT_4;  503
  reference to OCTREE_ELEMENT_STRUCT_4;  504
  reference to OCTREE_ELEMENT_STRUCT_4;  505
  reference to OCTREE_ELEMENT_STRUCT_2;  506
  reference to OCTREE_ELEMENT_STRUCT_2;  507
  reference to OCTREE_ELEMENT_STRUCT_3;  508
  reference to OCTREE_ELEMENT_STRUCT_3;  509
}

OCTREE_ELEMENT_STRUCT_2  /550
{ reference to OCTREE_LEAF_1;  /551
  reference to OCTREE_LEAF_2;  /552
  reference to OCTREE_LEAF_1;  /553
  reference to OCTREE_LEAF_2;  /554
  reference to OCTREE_LEAF_2;  /555
  reference to OCTREE_LEAF_1;  /556
  reference to OCTREE_LEAF_2;  /557
  reference to OCTREE_LEAF_1;  /558
}

OCTREE_ELEMENT_STRUCT_3  /570
{ reference to OCTREE_LEAF_3;  /571
  reference to OCTREE_LEAF_3;  /572
  reference to OCTREE_LEAF_3;  /573
  reference to OCTREE_LEAF_3;  /574
  reference to OCTREE_LEAF_3;  /575
  reference to OCTREE_LEAF_3;  /576
  reference to OCTREE_LEAF_3;  /577
  reference to OCTREE_LEAF_3;  /578
}

OCTREE_ELEMENT_STRUCT_4  /590
{ reference to OCTREE_LEAF_1;  /591
  reference to OCTREE_LEAF_1;  /592
  reference to OCTREE_LEAF_1;  /593
  reference to OCTREE_LEAF_1;  /594
  reference to OCTREE_LEAF_1;  /595
  reference to OCTREE_LEAF_1;  /596
  reference to OCTREE_LEAF_1;  /597
  reference to OCTREE_LEAF_1;  /598
}

OCTREE_LEAF_1  /531
{ Data (Materials, Occupancy, parameters.etc.);// shown as blank in Fig. 1
}

OCTREE_LEAF_2  /533
{ Data (Materials, Occupancy, parameters.etc.);// shown as dotted in Fig. 1
}

OCTREE_LEAF_3  /535
{ Data (Materials, Occupancy, parameters.etc.);// shown as hashed in Fig. 1
}
```

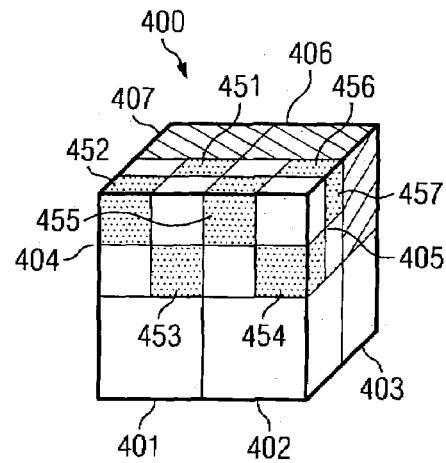

*Fig. 1*

SYSTEM AND METHOD FOR PROCESSING A HIERARCHICAL DATA TREE

CROSS-REFERENCE

This application is a continuation-in-part of U.S. patent application Ser. No. 10/306,464 entitled "EFFICIENT DATA STRUCTURE" filed on Nov. 27, 2002, which is hereby incorporated by reference.

This invention was made with the United States Government support under 70NANB1H3021 awarded by the National Institute of Standards and Technology (NIST). The United States Government has certain rights in the invention.

BACKGROUND

The present disclosure relates generally to solid model data manipulation and, more specifically, to systems and methods for processing data stored in a directed acyclic graph octree.

A Union Find data structure allows one to maintain and merge equivalence classes. The Union Find data structure can also be employed to join multiple sets together. However, performing the equivalence class merging with a particularly large and/or complex engineered or solid model can be lengthy and required copious storage. For example, to achieve sufficient resolution in some applications, the number of data elements may exceed 100 million or even 100 billion. While certainly desirable over other data structures, even the DAG octree data structure may provide insufficient efficiency to process and manipulate the model with existing computers. This concern is exacerbated when coupled with the desire to perform such data manipulation on common desktop computers.

Accordingly, what is needed in the art is a system and method that addresses the above-discussed issues.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 illustrates a perspective view of one embodiment of an object that may be modeled by a data structure according to aspects of the present disclosure.

FIG. 2 illustrates one embodiment of a pseudo-code representation of a DAG octree data structure according to aspects of the present disclosure.

DETAILED DESCRIPTION

Figure 3:
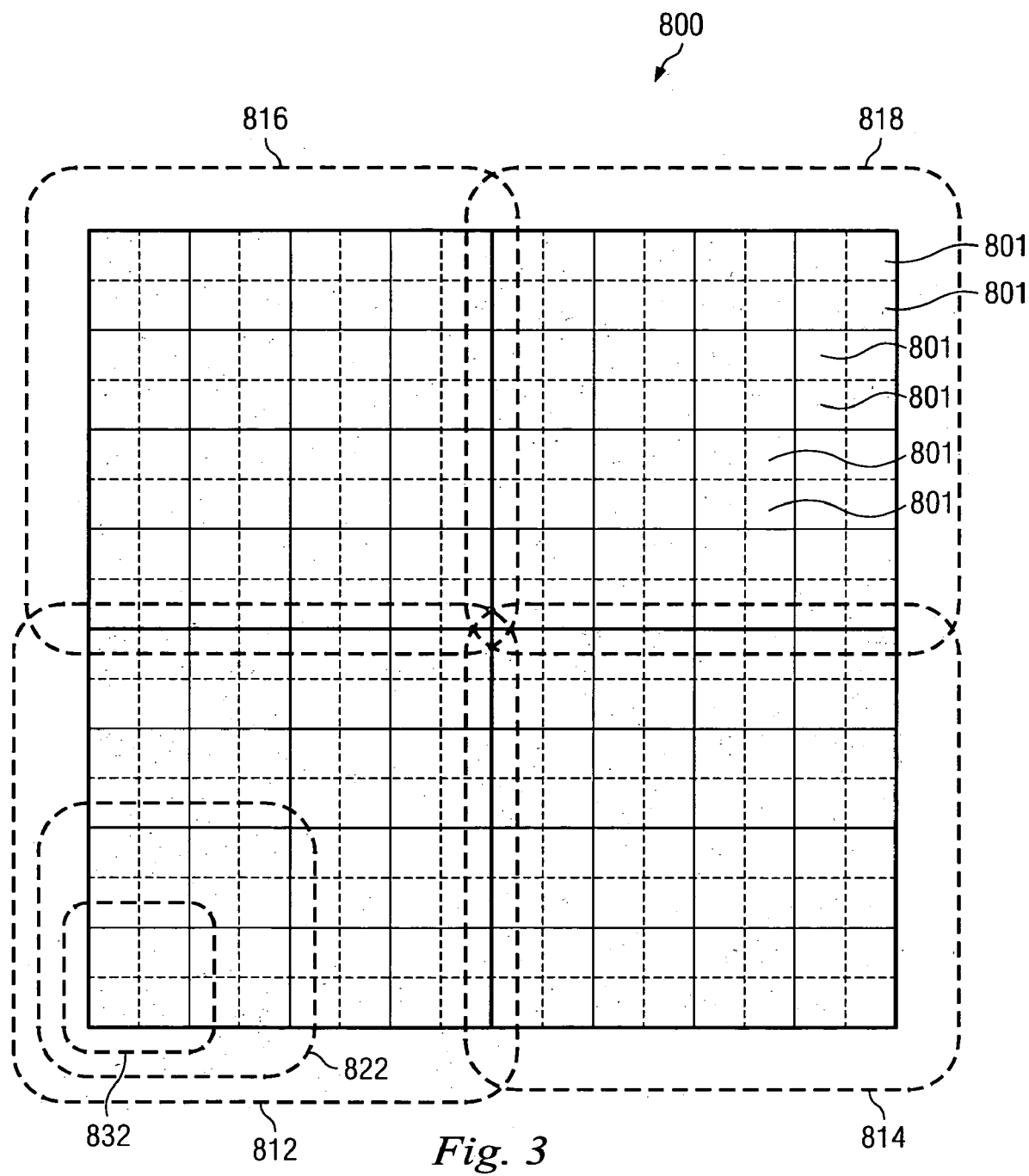
FIG. 3 illustrates a schematic view of a DAG quadtree through which analysis according to aspects of the present disclosure may be performed.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a perspective view of one embodiment of an object 400 that may be modeled by a data structure according to aspects of the present disclosure. The object 400 is divided into octree elements or cubes. The object 400 may represent a manufactured object with each octree element representing the respective material used for the respective octree element or cube. The entire bottom portion of the object 400 is shown as being empty. Specifically, a bottom front left element 401, a bottom front right element 402 and a bottom rear right element 403 are shown as being empty. The bottom rear left element is not shown in FIG. 1 due to the perspective of the drawing. A top rear right element 406 and a top rear left element 407 are shown as being uniformly composed of the same material. A top front left element 404 and a top front right element 405 are identical and possess "checkerboard" designs. For example, the top front left, the top rear right, the bottom rear left, and the bottom front right sub-elements of elements 404 and 405 may be uniformly composed of a selected material. That is, as shown in FIG. 1, elements 451, 452 and 453 of element 404 are composed of the selected material (the other element is not shown due to the perspective of the drawing). As also shown in the illustrated embodiment, elements 454, 455 and 456 of element 405 are composed of the selected material (the other element is not shown due to the perspective of the drawing).

Referring to FIG. 2, with continued reference to FIG. 1, illustrated is one embodiment of a pseudo-code representation of a DAG octree 500 that may represent the object 400 shown in FIG. 1 according to aspects of the present disclosure. OCTREE_ELEMENT_STRUCT_1 depicts the first regular spatial subdivision of the entire space occupied by the object 400, i.e., data elements 502 through 509 represent the eight octree elements or cubes at the first hierarchical level. The data elements 502, 503 and 504 respectively represent the elements 401, 402 and 403 of the object 400. A data element 505 represents the bottom rear left corner of the object 400 which is not shown in FIG. 1. All of these spatial subdivisions are identical. Accordingly, the spatial subdivisions are implemented using respective references or pointers to the same data structure (OCTREE_ELEMENT_STRUCT_4 590). Similarly, data elements 506 and 507 respectively represent the elements 404 and 405 of the object 400. Because the elements 404 and 405 are identical, the DAG octree 500 does not separately represent each of these elements as separate data structures. Instead, the data elements 506 and 507 may be advantageously implemented as references or pointers to refer to the same data structure (OCTREE_ELEMENT_STRUCT_2 550) that describes the same pattern. Data elements 508 and 509 represent the spatial subdivisions associated with the elements 406 and 407. Since the elements 406 and 407 are identical, the data elements 508 and 509 may be implemented as references to the same data structure (OCTREE_ELEMENT_STRUCT_3 570) that describes the same pattern.

The OCTREE_ELEMENT_STRUCT_2 550 represents another octree regular spatial subdivision. In this case, the OCTREE_ELEMENT_STRUCT_2 550 represents a "checkerboard" pattern. Data elements 551, 553, 556 and 558 may comprise a code or character that indicates that these leafs or elemental nodes are empty or associated with a null or default value. Data elements 552, 554, 555 and 557 may comprise a binary or non-binary data structure that represents the material composition of the associated leafs or elemental nodes (e.g., elements 451, 452, 453 and the bottom rear left element, which is not shown) of the object 400. In one embodiment, as shown in FIG. 2, each of the data elements 552, 554, 555 and 557 may comprise a pointer to data structure, such as the OCTREE_LEAF_1 531, OCTREE_LEAF_2 533 or OCTREE_LEAF_3 535, that represents the material composition, parameter, equivalence class or other characteristic of the corresponding elements of the object 400. Likewise, the OCTREE_ELEMENT_STRUCT_3 570 represents another octree regular spatial subdivision. In this case, the OCTREE_ELEMENT_STRUCT_3 570 represents the uniform composition of the elements 406 and 407 by comprising eight respective binary or non-binary data structures 571-578 (or pointers thereto) that describe the particular composition associated with the elements 406 and 407. OCTREE_ELEMENT_STRUCT_4 590 represents another octree regular spatial subdivision. In this case, the OCTREE_ELEMENT_STRUCT_4 590 represents the uniformly empty composition by comprising eight respective empty data structures 591-598.

The DAG octree 500 provides several advantages. First, the DAG octree 500 efficiently represents the redundancy of data associated with the object 400. For example, the elements 404 and 405 of the object 400 are identical. Accordingly, the paths associated with these elements are traversed by arriving at the same node via the pointers to the OCTREE_ELEMENT_STRUCT_2. Thus, the total amount of memory that is required to represent the object 400 is reduced. It shall be appreciated that only a single copy of the OCTREE_ELEMENT_STRUCT_2 is required regardless of how many times the spatial pattern it represents occurs within the overall data structure. Additionally, it shall be appreciated that the compressed data representation of the object 400 is lossless, i.e., the object 400 may be fully reconstructed from the data structure of the DAG octree 500 without loss of detail or resolution.

The pseudo-code representation of the DAG octree 500 is merely exemplary. Embodiments constructed according to aspects of the present disclosure may utilize any data structure representation or any suitable syntax or language to define a DAG tree structure that avoids or reduces repetition of patterns within the data structure. Also, it shall be appreciated that the scope of the present disclosure is not limited to octree structures. For example, embodiments constructed according to aspects of the present disclosure may operate with any arbitrary K-dimensional tree. Furthermore, embodiments within the scope of the present disclosure are not limited to the number of hierarchical levels shown in FIGS. 4 and 5, and may utilize any number of hierarchical levels, possibly subject to storage capacity used for a particular implementation.

Referring to FIG. 3, illustrated is a DAG quadtree 800 through which analysis according to aspects of the present disclosure may be performed. The quadtree 800 includes a bottom left second level node 812 (the first level node being the root node encompassing the entire quadtree 800), a bottom right second level node 814, a top left second level node 816 and a top right second level node 818. Similarly, the bottom left second level node 812 includes a bottom left third level node 822, and the bottom left third level node 822 includes a bottom left fourth level node 832. Such hierarchy may be further expanded to additional hierarchy levels as necessary to achieve a desired resolution of the object modeled by the DAG quadtree 800. In the embodiment shown in FIG. 3, the DAG quadtree 800 includes one additional hierarchy level comprising fifth level nodes 801. The fifth level nodes 801 may be considered elemental level nodes because they have the highest resolution of any of the hierarchy levels in the quadtree 800. These elemental level nodes are often referred to as "leaf" nodes.

Figure 4:
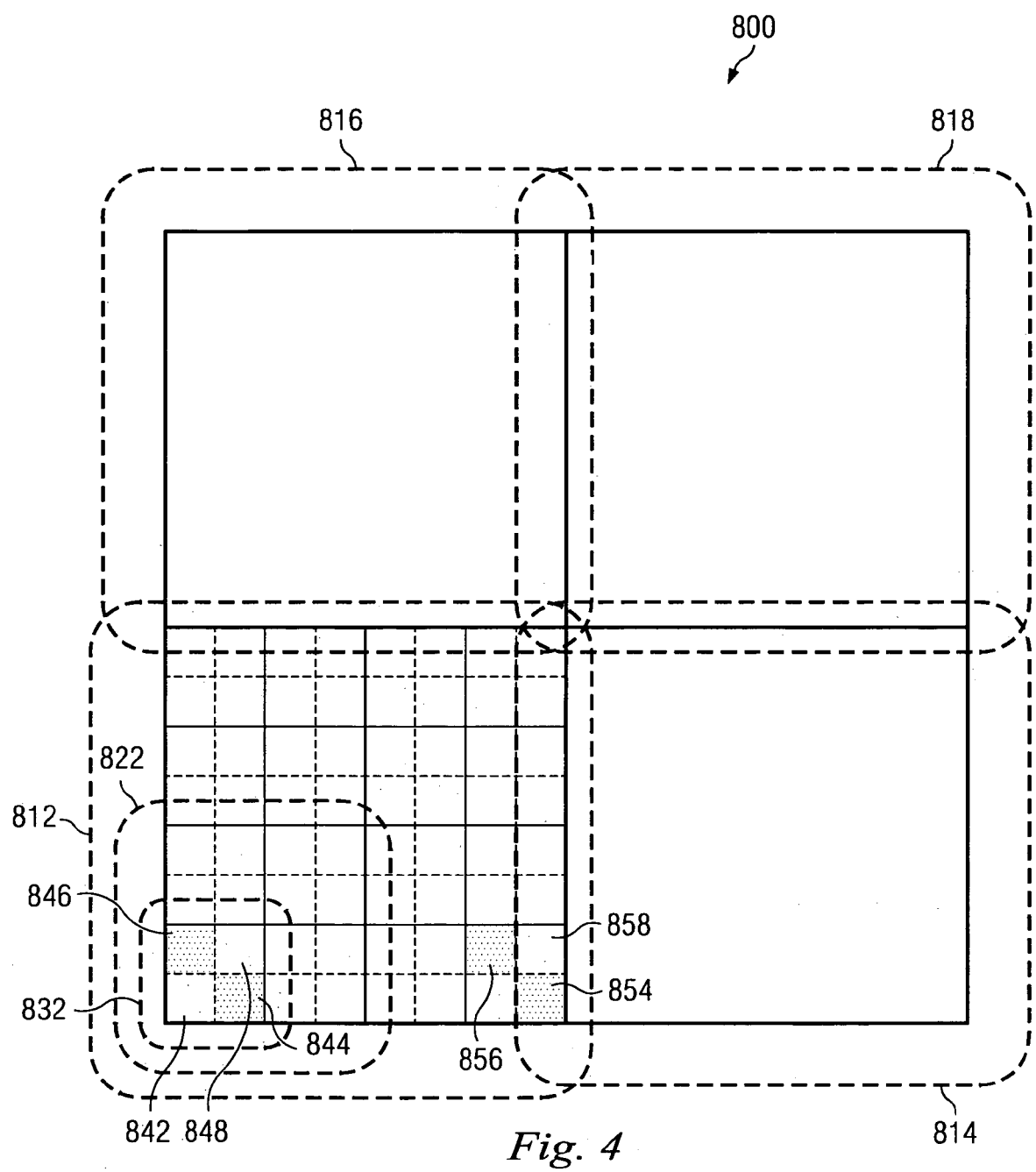
FIG. 4 illustrates a schematic view of the DAG quadtree shown in FIG. 3.

Referring to FIG. 4, illustrated is a simplified view of the DAG quadtree 800 shown in FIG. 3 and employed herein to convey a general concept of one embodiment of processing according to aspects of the present disclosure. Such processing may include performing an operation on the quadtree 800. During processing of the DAG quadtree 800, nodes at higher hierarchy levels are examined first, and nodes at lower hierarchy levels are only analyzed if similar nodes within the same higher hierarchy level have not yet been analyzed. Thus, the method of processing a hierarchical data tree or other analyses according to aspects of the present disclosure may be a top-down method.

Moreover, the order in which the nodes in each hierarchy level are analyzed may be the same for each node within a level. For example, a method of associating like components in the DAG quadtree 800 may, in one embodiment, begin by analyzing the bottom left second level node 812. Such analysis may comprise determining a key for each node analyzed. Such a key may be determined by examining the geometries and/or compositions of the node being analyzed and/or the neighboring nodes at the same hierarchy level. In one embodiment, the neighboring nodes examined may only be selected from nodes that have been previously examined. Thus, if the order of progression through the DAG quadtree 800 is bottom-left to top-right (e.g., second level node 812 is analyzed first, then second level node 814, then second level node 816, then second level node 818), the neighboring nodes examined may only be lower neighbors and left neighbors. In other embodiments, more than just the lower and left neighbors may be examined for each node being analyzed. For example, more than one lower and/or left neighbor may be examined.

After examining the geometries of the neighbors of the node being analyzed, a similar configuration of geometries/compositions of the node being analyzed and/or neighboring nodes is sought in the memory cache. If a similar configuration is found, the node being analyzed and its currently examined neighbors are re-written or configured with a post-operation configuration stored in the cache. In one embodiment, such re-writing or re-configuring comprises storing with the node being analyzed and its currently examined neighbors pointers referencing the node having the similar pre-operation neighbor configuration, in contrast to or in addition to storing post-operation information regarding the geometry/composition of the node being analyzed or its neighbors.

However, if a similar neighbor configuration is not found in the cache, lower hierarchy levels of the node being analyzed are then analyzed. Thus, in the current example, the bottom left second level node 812 is the first node at the second level that is analyzed, such that similar neighbor geometries will not be found in the cache (in fact, no neighbor geometries yet exist in the cache). Consequently, the nodes at the next lower hierarchy level in the second level node 812 are examined. Moreover, they are examined in the same order that the second level nodes are examined. Thus, the bottom left third level node 822 is examined (and then its right neighbor, and then its top neighbor, and so on) to detect data regarding the node 822 and its neighbors and query for similar node/neighbor configurations in the cache. Of course, in the present example, the bottom left third level node 822 is again the first node at the third hierarchy level to be analyzed, such that no neighbor configurations for the third hierarchy level yet exist in the cache. Consequently, a lower hierarchy level must be analyzed.

Thus, the bottom left fourth level node 832 is examined (and then its right neighbor, and then its top neighbor, and so on) to detect neighbor geometries/compositions/keys and seek similar neighbor configurations in the cache. Of course, in the present example, the bottom left fourth level node 832 is again the first node at the fourth hierarchy level to be analyzed, such that no neighbor configurations for the fourth hierarchy level yet exist in the cache. Consequently, a lower hierarchy level must be analyzed.

Accordingly, the only hierarchy level remaining is the fifth level, or elemental level, comprising the elemental level nodes 801. More specifically, the fourth level node 832 contains a bottom left elemental level node 842, a bottom right elemental level node 844, a top left elemental level node 846 and a top right elemental level node 848. Processing the data tree continues by looking at the bottom left elemental level node 842. Upon finding that the bottom left elemental level node 842 has no neighbors, a key-value pair is stored in the cache. In one embodiment, in contrast to merely storing a key-value pair for the bottom left elemental level node 842 because it has no neighbors, null values may be stored for each "missing" neighbor with each node analyzed. Storing null values in the manner where no neighbors exist for a node being analyzed may also be employed at higher hierarchy levels.

In general, a key corresponding to a node being analyzed may be based on the geometry of the node and possibly on the geometries of neighboring nodes. The geometries of elemental level nodes may comprise material composition information corresponding to the elemental level nodes. The material composition information may also comprise percentage values of a plurality of materials. The keys of elemental level nodes may alternatively or additionally comprise or be based on parameters of the nodes, such as pressure data, temperature data, etc. In one embodiment, the geometries include node occupancy data reflecting the percentage of a node that is occupied with a specific material. Keys may also comprise or be based on equivalent class information. The geometries of higher level nodes may comprise pointers to nodes at underlying hierarchical nodes. The geometry of any node may also comprise one or more pointers to nodes at the same hierarchy level. The keys may also correspond to values based on both a pointer and another type of geometry.

Ultimately, the processing of the data tree 800 continues by examining the top right elemental level node 848, such that the configuration of the neighboring elemental level nodes 844, 846 that have previously been examined will be determined (e.g., a key may be generated based on nodes 844, 846, 848, etc.). A similar neighbor configuration may then be sought in the cache. As above, if a similar configuration of the node being analyzed and its neighbors is found, then the only information stored for the top right elemental level node 848 may be a pointer referencing the elemental node having the similar neighbor configuration. However, if a similar neighbor configuration is not found in the cache, then an operation may be performed on a subset of the nodes being analyzed and a key-value pair is stored, possibly including neighbor configuration information. Thus, each of the four elemental level nodes 842, 844, 846, 868 in the second intermediate level node 832 may be analyzed and the method of processing the tree 800 moves on to subsequent fourth level nodes in the third level node 822, each time "drilling" down the hierarchy until similar neighbor configurations are found or key-value pairs are stored for each node in the hierarchy level being examined.

To further demonstrate that pointers may be stored for similar neighbor configurations found while querying the cache, elemental level nodes 844, 846, 854, 856 are illustrated as having similar compositions and equivalence classes or other types of geometries. When the method of processing the tree 800 proceeds to analyze elemental level node 858, the cache query will reveal that the neighbor configuration of the previously examined neighboring nodes 854, 856 is similar to the neighbor configuration of the previously examined elemental level nodes 844, 846 neighboring elemental level node 848, and further that the elemental level node 858 being analyzed is geometrically similar to the previously examined elemental level node 848. Accordingly, in contrast to performing connected component merging or other operations and subsequently storing the results for the elemental level node 858 (among others), the value of the elemental level node 858 is replaced by the previously cache information, possibly by storing a pointer to elemental level node 848.

The above description of FIGS. 3 and 4 may contemplate employing a method of processing the DAG octree 800 to find connected or associated components, wherein as matches are found in the cache, pointers to the value of those matches are stored in contrast to unique node information, and other operations are not performed on the tree 800. Such an application serves as an introduction to processing a hierarchical data tree employing results matching. However, results matching has many more applications. One such application employs results matching to process a hierarchical data tree while performing an operation on the tree. For example, a solid model represented by a hierarchical data tree may be manipulated by processing that employs results matching, such as to represent the solid model after a deposition or etching process.

Figure 5:
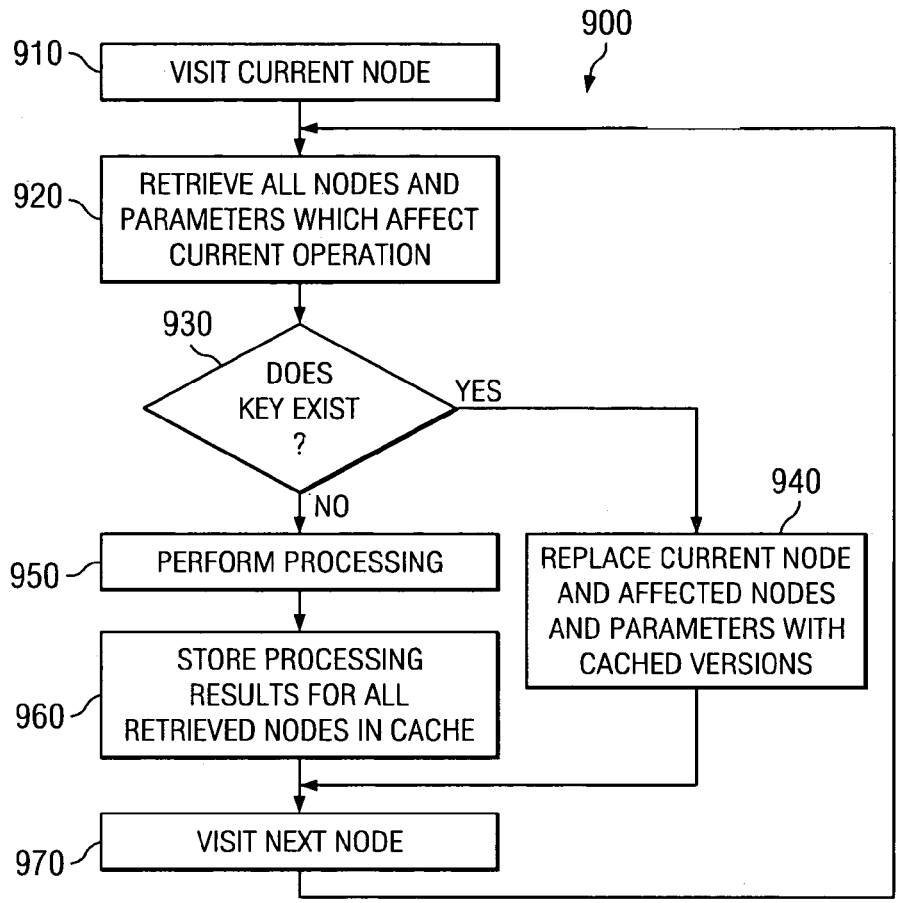
FIG. 5 illustrates a flow chart of one embodiment of a method of processing a hierarchical data tree according to aspects of the present disclosure.

Referring to FIG. 5, illustrated is a flow chart of a general embodiment of a method 900 of processing a hierarchical data tree employing results matching according to aspects of the present disclosure. The method 900 begins at a step 910 in which an initial node being analyzed is visited. In a subsequent step 920, the composition, geometries and/or other parameters are retrieved from the node and at least one neighboring node. The specific node being analyzed may be referred to as an anchor node within an iteration. Thus, in subsequent iterations, the anchor node will be a different node within the hierarchical data tree.

The specific number of neighboring nodes retrieved during the step 920 is dependent upon the particular operation desired to be performed on the data tree. For example, if the data tree represents a solid model of a silicon feature in a nano-electro-mechanical system (NEMS), micro-electromechanical system (MEMS) or other microelectronic device or physical structure, and if the operation being performed is an etch or other type of removal of a portion of the silicon feature, wherein the removed portion is to have a thickness of about 2 pixels, voxels or other element forming the elemental level nodes, two or three successively lower neighboring nodes may be retrieved (or the data representative thereof). That is, the immediately adjacent lower neighbor of the anchor node may be retrieved as well as the lower neighbor opposite the immediately adjacent lower neighbor from the anchor node.

In a subsequent decisional step 930, a key is sought in a cache or other storage medium. The key may represent one or more characteristics of the anchor node and the neighboring nodes retrieved in the step 920, including the geometries of the nodes, parametric data such as temperature and pressure, and/or other information.

The cache may include key/values pairs of data representing pre-operation and post-operation associations. In one embodiment, a key may correspond to geometries of a particular anchor node and its associated neighboring nodes in a pre-operation condition, state, status or configuration, wherein the value associated with that key may correspond to the geometries of the particular anchor node and its associated neighboring nodes in a post-operation condition, state, status or configuration.

For example, if the operation being performed by the processing is to etch or otherwise remove a portion of the solid model represented by the hierarchical data tree, wherein the removed portion is to have a thickness of about 3 voxels, the processing may entail examining three lower neighboring nodes with each anchor node. In such an embodiment, the pre-operation status of the anchor node and the three lower neighbors may be represented in binary form by four indicators as "0-1-1-1" wherein the anchor node is empty as represented by a "0" and the three lower neighboring nodes substantially comprise silicon as represented by a "1." After performing the operation to remove the top 3 voxels of silicon, the post-operation status of the anchor node and the three lower neighbors may be represented as "0-0-0-0." Thus, the key/value pair for this example may resemble "0-1-1-1/0-0-0-0," representing the pre- and post-operation configurations of the anchor node and the associated neighboring nodes. Of course, the present disclosure is not limited to the exemplary concatenated format described above, such that any format may be employed to represent the pre- and post-operation conditions for an anchor node and/or associated neighboring nodes.

In other embodiments, the operation performed on the data tree may be a method of associating like components or finding connected components. In such embodiments, the operation may comprise assigning the anchor node to one of a plurality of equivalence classes, wherein each node in an equivalence class may have a common trait, characteristic or parameter, or may point to one or more common nodes, or may collectively form a single component. In such or similar embodiments, the operation performed on the anchor node may include maintaining a count of the number of nodes assigned to each equivalence class. The operation performed on the data tree may also comprise updating a parameter of the anchor node and/or neighboring nodes. For example, temperature data, pressure data or stress data may be updated to reflect a step in a fabrication process. In such an embodiment, the keys in the cache may represent node temperatures before the operation, and the values in the cache may represent node temperatures after the operation.

If the key is found in the cache, the next step 940 in the method 900 replaces the anchor node and the neighbors retrieved in the step 920 with the cached data. That is, the pre-operation configuration is re-written as the post-operation configuration from the cache, without actually having to perform the "etching" operation. Alternatively, pointers to the previously found, similar configuration may be stored for the node currently being analyzed. In one embodiment, only the data in the anchor node and/or the neighbors that are affected by the operation are replaced in the step 940. Thus, some of the neighboring nodes may be retrieved because they may affect the operation, in contrast to being affected by the operation. Accordingly, only a subset of the retrieved nodes may be re-written in the step 940.

However, if the key is not found in the cache, the operation is performed on the pre-operation configuration of the anchor node and the neighboring nodes in a step 950, such that a key-value pair may be generated for the pre- and post-operation configurations of the pattern of the anchor node being analyzed and the associated neighboring nodes. The key-value pair may then be stored in the cache in a step 960, such that if a similar pre-operation configuration of the anchor node and the neighboring nodes is found during a subsequent iteration, the operation will not have to be repeated, and additional operations results will not need to be stored. After the step 960 is completed, or after the step 940 is completed, the next anchor mode is visited in a subsequent step 970.

The steps 920-970 may then be repeated until each unique node at each hierarchy level is visited. However, in some embodiments, such as in applications in which the number of hierarchy levels is larger than about 10, or possibly in applications in which the number of elemental nodes exceeds some predetermined, large quantity (e.g., 10,000), or other applications, the method 900 may not be repeated for each upper hierarchical level.

Although not illustrated as such, the method 900 may also include expunging one or more key-value pairs from the cache. For example, the size of the cache may be limited in view of available storage. As such, the number of key-value pairs storable in the cache may be less than the unique number of nodes in the data tree. Thus, as the cache attains or approaches a predetermined occupancy or capacity, previously stored key-value pairs may be expunged to make room for the more recently generated key-value pairs. In one embodiment, the expunged key-value pairs are those that have been located by the cache query in the step 830 the fewest number of times compared to the remaining key-value pairs, or those that have been least recently accessed (e.g., least-recently-used, "LRU"). Moreover, it follows that in some embodiments the expunged key-value pairs may be those that have never been located by the cache query in the step 830, such that the expunged key-value pairs are non-matched key-value pairs.

Figure 6:
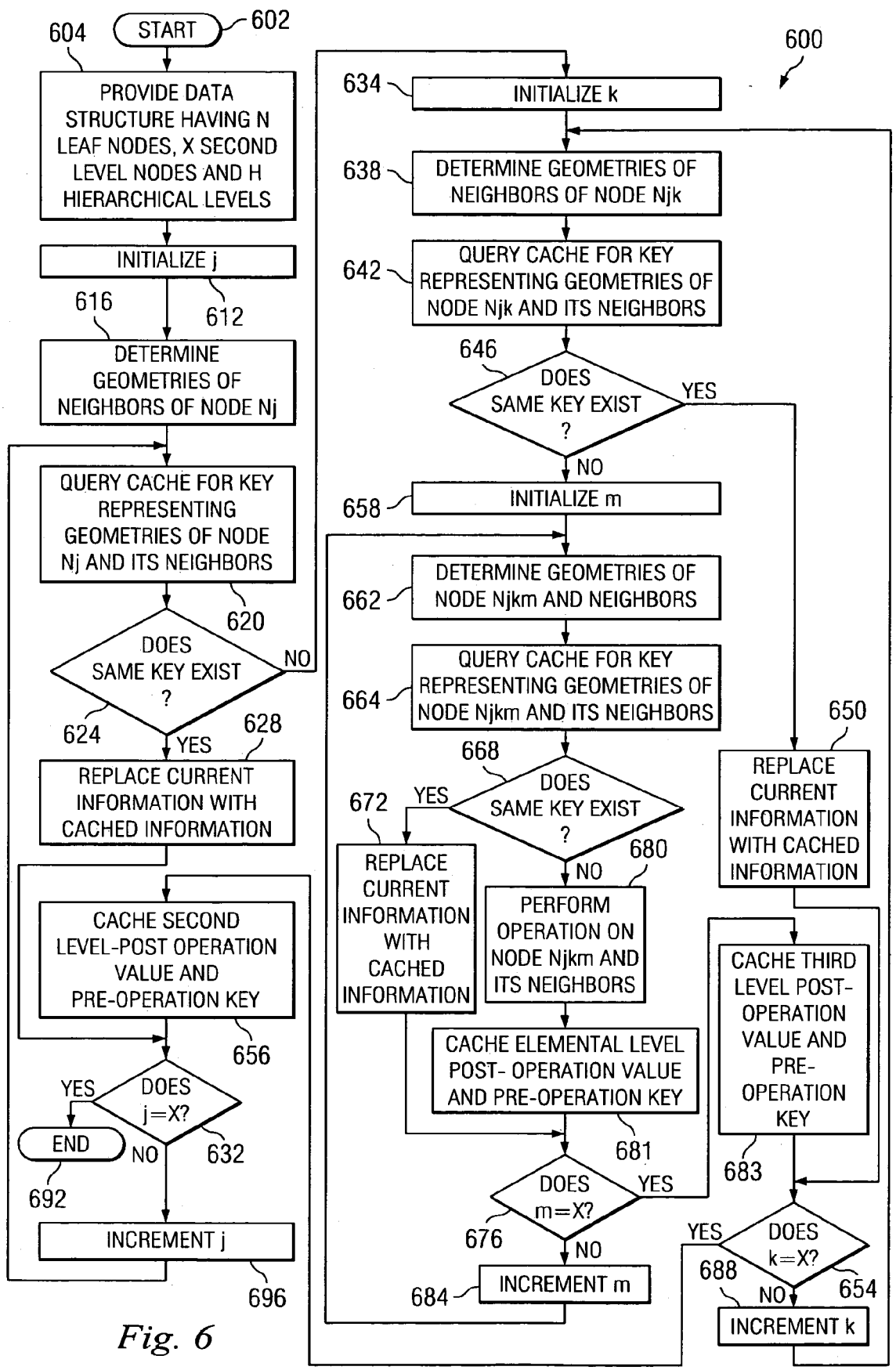
FIG. 6 illustrates a flow chart of another embodiment of a method of processing a hierarchical data tree according to aspects of the present disclosure.

Referring to FIG. 6, illustrated is a flow chart of one embodiment of a method 600 of processing a hierarchical data tree according to aspects of the present disclosure. The method 600 is one environment in which the results matching described above may be implemented. The method 600 may also be similar to the method discussed above in reference to FIGS. 3 and 4. Moreover, many of the steps of the method 600 described herein may be optional, and the method 600 may also include other steps not explicitly or inherently described herein.

The method 600 begins in a start step 602 and then proceeds to a step 604 in which an octree or other data structure is provided. In one embodiment, the data structure is a directed acyclic graph (DAG) structure having 3 dimensions. Of course, aspects of the present disclosure are equally applicable to 1-dimensional, 2-dimensional, 4-dimensional and other data structures. Thus, the data structure may be a quadtree, an octree, etc. The data structure may also be a shared tree.

In the illustrated embodiment, the data structure has N elemental level or "leaf" nodes, X second level nodes and H hierarchical levels. The number N of elemental level nodes may equal the number X of second level nodes to the power of one less than the number H of hierarchical levels ($N=X^{(H-1)}$). In the illustrated embodiment, there are 4 hierarchical levels (H=4). However, the aspects demonstrated by the method 600 shown in FIG. 6 are readily adaptable to data structures having greater than or less than 4 hierarchical levels within the scope of the present disclosure. If the data structure is a quadtree, it may include 4 second level nodes, and if the data structure is an octree, if may include 8 second level nodes. Of course, aspects of the present disclosure are applicable or readily adaptable to data structures having any number of elemental level nodes, second level nodes and hierarchical levels.

The method 600 proceeds from the step 604 to a step 612 in which a first counter j is initialized. In a subsequent step 616, the geometries of second level nodes neighboring a second level node Nj are determined. For example, the compositions of two neighboring second level nodes may be examined if the data structure is a quadtree, or the compositions of three neighboring second level nodes may be examined in the data structure is an octree, if the method 600 is employing results matching to find like or connected components. The neighboring second level nodes examined in the step 616 may be selected from only previously examined second level nodes in some embodiments. Of course, if the second level node Nj does not have a sufficient number of neighboring second level nodes, or a sufficient number of previously examined neighboring second level nodes, the step 616 may be skipped during an individual iteration. However, in another embodiment, in contrast to skipping the step 616 when no neighbors are detected, null values may be stored for such "missing" neighbors. Of course, any of the steps described herein may be skipped in some embodiments.

A cache is queried for similar or identical neighbor configurations or orientations in a subsequent step 620. In a decisional step 624, the results from the query in the step 620 are employed to determine subsequent action in the method 600. For example, if the neighbor configuration or orientation associated with the second level node Nj being analyzed is found in the cache during the query, the method 600 proceeds to a step 628, wherein the second level node Nj being analyzed is linked with the second level node having the similar or identical neighbor configuration. In one embodiment, such linking may include storing a pointer referencing the linked second level node as a key-value pair for the second level node Nj. In another embodiment, such linking may comprise replacing pre-operation data represented by the key located in the cache by the query with the post-operation data of the key-value pair located by the query. In one embodiment, such re-writing may be accomplished or replaced by storing a pointer for the second level node Nj referencing the node represented by the node corresponding to the key-value pair located in the cache by the query. Thereafter, the method 600 continues to another decisional step 632, described below.

However, if the results of the query performed in the steps 620, 624 are negative, such that a similar or identical neighbor configuration or orientation is not found in the cache for the second level node Nj being analyzed, the method 600 proceeds to a step 634 in which a second counter k is initialized. In a subsequent step 638, the geometries of third level nodes neighboring a third level node Njk are determined in a manner similar to the determination of geometries of neighboring second level nodes performed in the previous step 616.

The cache is queried for similar or identical neighbor configurations or orientations in a subsequent step 642. In a decisional step 646, the results from the query in the step 642 are employed to determine subsequent action in the method 600. For example, if the neighbor configuration or orientation associated with the third level node Njk being analyzed is found in the cache during the query, the method 600 proceeds to a step 650, wherein the third level node Njk being analyzed is replaced with or directed to the third level node having the similar or identical neighbor configuration, such linking being similar to the linking described above. Thereafter, the method 600 continues to a another decisional step 654, described further below.

However, if the results of the query performed in the steps 642, 646 are negative, such that a similar or identical neighbor configuration or orientation is not found in the cache for the third level node Njk being analyzed, the method 600 proceeds to a step 658 in which a third counter m is initialized. In a subsequent step 662, the geometries of elemental level nodes neighboring an elemental level node Njkm are determined in a manner similar to the determination of geometries of neighboring third level nodes performed in the previous step 638.

The cache is queried for similar or identical neighbor configurations or orientations in a subsequent step 664. In a decisional step 668, the results from the query in the step 664 are employed to determine subsequent action in the method 600. For example, if the neighbor configuration or orientation associated with the elemental level node Njkm being analyzed is found in the cache during the query, the method 600 proceeds to a step 672, wherein the elemental level node Njkm being analyzed is replaced with or directed to the elemental level node having the similar or identical neighbor configuration. Thereafter, the method 600 continues to a another decisional step 676, described further below.

However, if the results of the query performed in the steps 664, 668 are negative, such that a similar or identical neighbor configuration or orientation is not found in the cache for the elemental level node Njkm being analyzed, the method 600 proceeds to a step 680 in which the operation is performed on the elemental level node Njkm and possibly its neighboring nodes. The pre-/post-operation data pair for node Njkm and possibly its neighboring nodes is then stored in the cache in a step 681. Thereafter, the method 600 proceeds to the decisional step 676.

In the illustrated embodiment, the decisional step 676 compares the current value of the third counter m to the number X of second level nodes. That is, in some embodiments, such as those in which the data structure is a standard octree or quadtree, the number of elemental level nodes in a parent node will be the same as the number of second level nodes in the data structure. Of course, the decisional step 676 may compare the third counter m to other values within the scope of the present disclosure. If it is determined in the decisional step 676 that the third counter m is equal to the number X (or other comparison value), the method 600 proceeds to the step 683. During the step 683, the pre-/post-operation data pair for the third level node Njk and possibly its neighbors is stored in the cache, and the method 600 proceeds to the decisional step 654.

However, if it is determined in the decisional step 676 that the third counter m is less than the number X, the method 600 proceeds to a step 684 in which the third counter m is incremented. The method 600 then proceeds once more to the step 662 to determine the geometries of the neighbors of the elemental level node Njk(m+1) and continues as described above. Thus, the third counter m may be employed to step through each of the elemental level nodes Njkm within a particular third level node Njk.

The decisional step 654 compares the current value of the second counter k to the number X of second level nodes. However, as discussed above, the second counter k may also be compared to other values within the scope of the present disclosure. If it is determined in the decisional step 654 that the second counter k is equal to the number X, the method 600 proceeds to the step 656. During the step 656, the pre-/post-operation data pair for the second level node Nj and possibly its neighbors is stored in the cache, and the method 600 proceeds to the decisional step 632.

However, if it is determined in the decisional step 654 that the second counter k is less than the number X, the method 600 proceeds to a step 688 in which the second counter k is incremented. The method 600 then proceeds once more to the step 638 to determine the geometries of the neighbors of the intermediate level node Nj(k+1) and continues as described above. Thus, the second counter k may be employed to step through each of the third level nodes Njk within a particular second level node Nj.

The decisional step 632 compares the current value of the first counter j to the number X of second level nodes. However, as discussed above, the first counter j may also be compared to other values within the scope of the present disclosure. If it is determined in the decisional step 632 that the first counter j is equal to the number X, the method 600 proceeds to an end step 692. However, if it is determined in the decisional step 632 that the first counter j is less than the number X, the method 600 proceeds to a step 696 in which the first counter j is incremented. The method 600 then proceeds once more to the step 620 to determine the geometries of the neighbors of the second level node N(j+1) and continues as described above. Thus, the first counter j may be employed to step through each of the second level nodes Nj within the data structure.

It is appropriate to compare DAG octree structures according to embodiments of the present disclosure with concepts associated with known graphical data structures. Specifically, a certain amount of loss (e.g., by quantization) is thought to be typically required to store data that is used to create graphical images in an efficient manner. This assumption may be correct for various classes of data (e.g., digital photographs) related to graphical images. However, this assumption is not correct for specific classes of data. In particular, engineered objects may comprise a large degree of regularity or redundancy. Thus, engineered objects may be very efficiently represented by a DAG octree data structure according to embodiments of the present invention.

Figure 7:
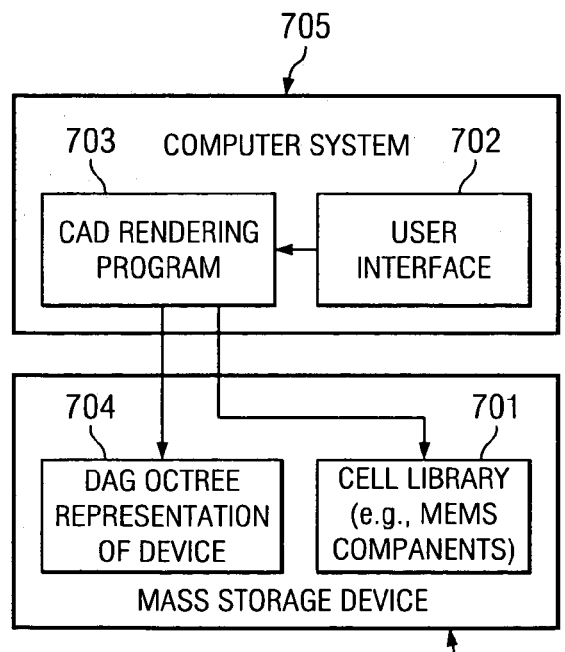
FIG. 7 illustrates a schematic view of one embodiment of a CAD system according to aspects of the present disclosure.

Referring to FIG. 7, illustrated is a schematic view of one embodiment of a computer aided design (CAD) or other processing system 700 constructed according to aspects of the present disclosure. The system 700 may be designed to create engineered objects (e.g., NEMS, MEMS and/or other microelectronic devices) from, in part, standard cell components. The standard cell components may be stored in a library 701 stored utilizing a mass storage device 706. For example, in a MEMs device design, the cell components may include discrete MEMs elements, such as thermal actuators, electrostatic actuators, micro-grippers, micro-latches, micro-tethers, micro-rotators and/or the like. The standard cell components may define the respective spatial composition of the various discrete elements.

A user interface 702 and a rendering program 703 may be implemented as software processes executable on a computer system 705. In one embodiment, a user may "pick-and-place" discrete cell components utilizing the user interface 702 and, in response, the rendering program 703 may select the respective cell component from the cell library 701. When the user "drops" the discrete cell component at a desired location, the rendering program 703 may locate the respective portions of a DAG octree representation 704 of the device being designed. The rendering algorithm 703 may update the portions of the DAG octree representation 704 to reflect the addition of the cell component. Specifically, the respective elemental level nodes of the DAG octree 704 may be created and/or modified to reflect the material composition(s) of the cell component at the respective locations. Such processing may be similar to the processing described above in reference to FIGS. 3-6. For MEMs devices, a binary or non-binary data structure may be employed to identify possible material compositions such as semiconductor materials, oxides, ceramics, metals and/or the like.

Moreover, after the addition of a discrete component, the rendering algorithm 703 may examine the DAG octree 704 to ensure that the addition of the data associated with the added element does not cause any repeated patterns within the nodes of the DAG octree representation 704. If a repeated pattern is discovered, the CAD rendering program 703 may modify the DAG octree representation 704 to comprise a reference or pointer to another suitable node of the DAG octree representation 704 to eliminate the repeated pattern. Accordingly, the system 700 may store representations of engineered devices in an efficient manner thereby reducing the memory requirements necessary to operate the system 700.

In one embodiment, the CAD rendering program 703 or other portion of the system 700 may comprise means for retrieving data from an anchor node in the tree 704 and a plurality of neighboring nodes affected by the operation. The rendering program 703 or other portion of the system 700 may also include means for querying the library 701 or other cache in the mass storage device 706 for a key representative of the anchor node and the plurality of neighboring nodes based on the retrieved data. The system 700 may also include means for replacing the retrieved data with cached data if the query finds a match, as well as means for performing the operation on the retrieved data to generate post-operation data, replacing the retrieved data with the post-operation data and storing the post-operation data in the cache based on the key if the query does not find a match.

It may follow from the preceding discussion that the processing of a hierarchical data tree as described above may also be implemented as a program product. Such a program product may be employed with or executed by the system 700 shown in FIG. 7. In one embodiment, the program product includes a computer-readable storage medium and means recorded on the medium for retrieving data from an anchor node in the tree and a plurality of neighboring nodes affected by the operation. Means also recorded on the medium are configured to query a cache for a key representative of the anchor node and the plurality of neighboring nodes based on the retrieved data. The program product also includes means recorded on the medium for replacing the retrieved data with cached data if the query finds a match. The program product also includes means recorded on the medium for performing the operation on the retrieved data to generate post-operation data, replacing the retrieved data with the post-operation data and storing the post-operation data in the cache based on the key if the query does not find a match. The storage medium may be a magnetic or optical recording medium which is readable by a computer, such as by the system 700 shown in FIG. 7. The storage medium may also be a network distribution medium, such as may be employed for downloading the program product over a wired and/or wireless network.

Thus, in general, the present disclosure provides a method for performing an operation on a hierarchical data tree comprising visiting an anchor node in the tree and retrieving data from the anchor node and a plurality of neighboring nodes each potentially affected by the operation. A cache is queried for a key representing the anchor node and the plurality of neighboring nodes in a pre-operation condition based on the retrieved data, wherein the cache stores pre-operation/post-operation data pairs. If the query finds a match, at least a sub-set of the pre-operation retrieved data is replaced with cached post-operation data. If the query does not find a match, the operation is performed on the pre-operation retrieved data to generate post-operation data, the pre-operation retrieved data is replaced with the post-operation data and the post-operation data is stored in the cache with the associated pre-operation retrieved data.

The present disclosure also introduces a processing system for performing an operation on a hierarchical data tree. In one embodiment, the system includes means for retrieving data from an anchor node in the tree and a plurality of neighboring nodes affected by the operation. The system also includes means for querying a cache for a key representative of the anchor node and the plurality of neighboring nodes based on the retrieved data. Means for replacing the retrieved data with cached data if the query finds a match are also included in the system, as well as means for performing the operation on the retrieved data to generate post-operation data, replacing the retrieved data with the post-operation data and storing the post-operation data in the cache based on the key if the query does not find a match.

A program product is also provided in the present disclosure. The program product includes a computer-readable storage medium and means recorded on the medium for retrieving data from an anchor node in the tree and a plurality of neighboring nodes affected by the operation. Means also recorded on the medium are configured to query a cache for a key representative of the anchor node and the plurality of neighboring nodes based on the retrieved data. The program product also includes means recorded on the medium for replacing the retrieved data with cached data if the query finds a match. The program product also includes means recorded on the medium for performing the operation on the retrieved data to generate post-operation data, replacing the retrieved data with the post-operation data and storing the post-operation data in the cache based on the key if the query does not find a match.

The present disclosure also provides a method for performing an operation on a hierarchical data tree comprising, in one embodiment, retrieving data from an anchor node in the tree and a plurality of neighboring nodes each potentially affected by the operation and querying a cache for a key representing the anchor node and the plurality of neighboring nodes based on the retrieved data. If the query finds a match, the retrieved data is replaced with cached data. If the query does not find a match, the operation is performed on the retrieved data to generate post-operation data, the retrieved data is replaced with the post-operation data and the post-operation data is stored in the cache based on the key.

The foregoing has outlined features of several embodiments so that those skilled in the art may better understand the detailed description that follows. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they can make various changes, substitutions and alterations herein without departing from the spirit and scope of the present disclosure.

What is claimed is:

1. A method for performing an operation on a hierarchical data tree, comprising:
   visiting an anchor node in the tree;
   retrieving data from the anchor node and a plurality of neighboring nodes each potentially affected by the operation;
   querying a cache for a key representing the anchor node and the plurality of neighboring nodes in a pre-operation condition based on the retrieved data, wherein the cache stores pre-operation/post-operation data pairs;
   if the query finds a match, replacing the pre-operation retrieved data with cached post-operation data; and
   if the query does not find a match, performing the operation on the pre-operation retrieved data to generate post-operation data, replacing the pre-operation retrieved data with the post-operation data and storing the post-operation data in the cache with the associated pre-operation retrieved data.

2. The method of claim 1 wherein the retrieving data from the anchor node and a plurality of neighboring nodes each potentially affected by the operation further comprises retrieving data from at least one neighboring node affecting the operation.

3. The method of claim 1 wherein the pre-operation retrieved data is replaced with cached post-operation data for a subset of the nodes for which pre-operation data was retrieved.

4. The method of claim 3 wherein the operation assigns the anchor node to one of a plurality of equivalence classes and maintains a count of the number of nodes in each of the plurality of equivalence classes.

5. The method of claim 1 wherein the hierarchical data tree represents a physical structure and the operation comprises modifying the retrieved data to reflect the addition of material to the physical structure.

6. The method of claim 1 wherein the hierarchical data tree represents a physical structure and the operation comprises modifying the retrieved data to reflect the removal of material from the physical structure.

7. The method of claim 1 wherein the operation modifies a parameter of at least one of the anchor node and the plurality of neighboring nodes.

8. The method of claim 7 wherein the parameter is a temperature of the at least one of the anchor node and the plurality of neighboring nodes.

9. The method of claim 7 wherein the parameter is a pressure of the at least one of the anchor node and the plurality of neighboring nodes.

10. The method of claim 7 wherein the parameter is a stress of the at least one of the anchor node and the plurality of neighboring nodes.

11. The method of claim 7 wherein the parameter is an equivalence class.

12. The method of claim 7 wherein the parameter is a composition of the at least one of the anchor node and the plurality of neighboring nodes.

13. The method of claim 12 wherein the composition comprises a percentage of occupation of the at least one of the anchor node and the plurality of neighboring nodes by a predetermined material.

14. The method of claim 12 wherein the composition comprises a percentage of occupation of the at least one of the anchor node and the plurality of neighboring nodes by each of a plurality of predetermined materials.

15. The method of claim 1 wherein the tree is an X-dimensional tree and the plurality of neighboring nodes includes at least X neighboring nodes.

16. The method of claim 1 wherein the tree is an X-dimensional tree and the plurality of neighboring nodes consists of X neighboring nodes.

17. The method of claim 1 wherein the tree has a directed acyclic graph structure.

18. The method of claim 1 wherein the tree is an octree.

19. The method of claim 1 wherein the tree is a quadtree.

20. The method of claim 1 wherein the tree is a shared tree.

21. The method of claim 1 further comprising expunging non-matched data from the cache when the cache attains a predetermined occupancy.

22. The method of claim 1 wherein replacing the retrieved data with cached data comprises replacing the retrieved data with pointers to previously examined nodes represented by the cached data.

23. The method of claim 1 wherein the data retrieval, cache querying and data replacement based on results of the cache querying is repeated with each unique node in the tree treated as the anchor node.

24. The method of claim 1 wherein the tree represents a microelectronic device.

25. The method of claim 24 wherein the microelectronic device is a MEMS device.

26. The method of claim 24 wherein the microelectronic device is a NEMS device.

27. A processing system for performing an operation on a hierarchical data tree, comprising:
   means for retrieving data from an anchor node in the tree and a plurality of neighboring nodes affected by the operation;
   means for querying a cache for a key representative of the anchor node and the plurality of neighboring nodes based on the retrieved data;
   means for replacing the retrieved data with cached data if the query finds a match; and
   means for performing the operation on the retrieved data to generate post-operation data, replacing the retrieved data with the post-operation data and storing the post-operation data in the cache based on the key if the query does not find a match.

28. The system of claim 27 wherein the means for performing the operation on the retrieved data includes means for assigning the anchor node to one of a plurality of equivalence classes.

29. The system of claim 28 wherein the means for performing the operation further includes means for maintaining a count of the number of nodes in each of the plurality of equivalence classes.

30. The system of claim 27 wherein the means for performing the operation includes means for modifying the retrieved data to reflect the addition of material to physical structure represented by the tree.

31. The system of claim 27 wherein the means for performing the operation includes means for modifying the retrieved data to reflect the removal of material from physical structure represented by the tree.

32. The system of claim 27 wherein the means for performing the operation includes means for modifying a parameter of at least one of the anchor node and the plurality of neighboring nodes.

33. The system of claim 27 further comprising means for expunging non-matched data from the cache when the cache attains a predetermined occupancy.

34. The system of claim 27 wherein the means for replacing the retrieved data with cached data replaces the retrieved data with pointers to previously examined nodes represented by the cached data.

35. The system of claim 27 further comprising means for repeating the data retrieval, cache querying and data replacement based on results of the cache querying with each unique node in the tree treated as the anchor node.

36. The system of claim 27 wherein the tree represents a microelectronic device.

37. The system of claim 36 wherein the microelectronic device is a MEMS device.

38. The system of claim 36 wherein the microelectronic device is a NEMS device.

39. A program product, comprising:
   a computer-readable storage medium;
   means recorded on the medium for retrieving data from an anchor node in a hierarchical data tree and a plurality of neighboring nodes affected by an operation to be performed on the tree;
   means recorded on the medium for querying a cache for a key representative of the anchor node and the plurality of neighboring nodes based on the retrieved data;
   means recorded on the medium for replacing the retrieved data with cached data if the query finds a match; and
   means recorded on the medium for performing the operation on the retrieved data to generate post-operation data, replacing the retrieved data with the post-operation data and storing the post-operation data in the cache based on the key if the query does not find a match.

40. The program product of claim 39 wherein the means for performing the operation on the retrieved data includes means for assigning the anchor node to one of a plurality of equivalence classes.

41. The program product of claim 40 wherein the means for performing the operation further includes means for maintaining a count of the number of nodes in each of the plurality of equivalence classes.

42. The program product of claim 39 wherein the means for performing the operation includes means for modifying the retrieved data to reflect the addition of material to physical structure represented by the tree.

43. The program product of claim 39 wherein the means for performing the operation includes means for modifying the retrieved data to reflect the removal of material from physical structure represented by the tree.

44. The program product of claim 39 wherein the means for performing the operation includes means for modifying a parameter of at least one of the anchor node and the plurality of neighboring nodes.

45. The program product of claim 39 further comprising means for expunging non-matched data from the cache when the cache attains a predetermined occupancy.

46. The program product of claim 39 wherein the means for replacing the retrieved data with cached data replaces the retrieved data with pointers to previously examined nodes represented by the cached data.

47. The program product of claim 39 further comprising means for repeating the data retrieval, cache querying and data replacement based on results of the cache querying with each unique node in the tree treated as the anchor node.

48. The program product of claim 39 wherein the tree represents a microelectronic device.

49. The program product of claim 48 wherein the microelectronic device is a MEMS device.

50. The program product of claim 48 wherein the microelectronic device is a NEMS device.

51. The program product of claim 39 wherein the storage medium is a magnetic recording medium.

52. The program product of claim 39 wherein the storage medium is an optical recording medium.

53. The program product of claim 39 wherein the storage medium is a network distribution medium.

54. A method for performing an operation on a hierarchical data tree, comprising:

retrieving data from an anchor node in the tree and a plurality of neighboring nodes each potentially affected by the operation;

querying a cache for a key representing the anchor node and the plurality of neighboring nodes based on the retrieved data;

if the query finds a match, replacing the retrieved data with cached data; and if the query does not find a match, performing the operation on the retrieved data to generate post-operation data, replacing the retrieved data with the post-operation data and storing the post-operation data in the cache based on the key.

55. The method of claim 1 wherein at least one of the plurality of retrieved neighboring nodes each potentially affected by the operation is separated from the anchor node by at least one node.

* * * * *